(12) United States Patent
Kinouchi

(10) Patent No.: US 7,085,205 B1
(45) Date of Patent: Aug. 1, 2006

(54) RECORDING AND/OR REPRODUCING APPARATUS

(75) Inventor: Takashi Kinouchi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/674,106

(22) PCT Filed: Feb. 23, 2000

(86) PCT No.: PCT/JP00/01040

§ 371 (c)(1),
(2), (4) Date: Dec. 26, 2000

(87) PCT Pub. No.: WO00/51117

PCT Pub. Date: Aug. 31, 2000

(30) Foreign Application Priority Data

Feb. 25, 1999 (JP) .................................. 11/047457

(51) Int. Cl.
*G11B 19/02* (2006.01)
(52) U.S. Cl. .............................. 369/47.12; 369/47.13; 369/84; 710/58
(58) Field of Classification Search ................ 369/84, 369/59.14, 53.24, 47.12, 85, 47.35, 96, 103, 369/47.13, 94; 360/15; 386/96, 103, 54, 386/95; 380/200, 255; 700/235, 34; 375/200, 375/220; 710/45, 58, 94, 100, 105, 66, 69, 710/70, 71
See application file for complete search history.

(56) References Cited

U.S. PATENT DOCUMENTS

| 4,811,325 | A | * | 3/1989 | Sharples et al. | ............... 369/85 |
|---|---|---|---|---|---|
| 5,485,447 | A | * | 1/1996 | Minoda | .................... 369/47.12 |
| 5,592,511 | A | * | 1/1997 | Schoen et al. | .............. 375/220 |
| 5,631,888 | A | * | 5/1997 | Itoh et al. | ................ 369/47.12 |
| 5,717,953 | A | * | 2/1998 | Tsutsui et al. | ................ 710/45 |
| 5,726,909 | A | * | 3/1998 | Krikorian | .................... 700/94 |
| 5,949,688 | A | * | 9/1999 | Montoya et al. | ............ 700/235 |
| 5,991,835 | A | * | 11/1999 | Mashimo et al. | ............. 710/58 |
| 6,075,920 | A | * | 6/2000 | Kawamura et al. | ........... 386/95 |
| 6,088,455 | A | * | 7/2000 | Logan et al. | ................ 380/200 |
| 6,137,642 | A | * | 10/2000 | Inoue | ...................... 369/53.24 |
| 6,205,104 | B1 | * | 3/2001 | Nagashima et al. | ..... 369/59.14 |
| 6,263,154 | B1 | * | 7/2001 | Scheffler | ..................... 386/96 |

\* cited by examiner

*Primary Examiner*—William Korzuch
*Assistant Examiner*—Kim-Kwok Chu
(74) *Attorney, Agent, or Firm*—Lerner, David, Littenberg, Krumholz & Mentlik, LLP

(57) ABSTRACT

A recording and/or reproducing apparatus for causing data recorded on a first recording medium to be stored in a second recording medium. This recording and/or reproducing apparatus includes a reproducing unit for reading out data from the first recording medium at a transmission rate faster than a standard readout rate of the first recording medium, a storage unit for storing the data read out from the first reproducing unit, a recording unit for storing the data read out from this storage unit on the second recording medium and a controlling unit for controlling the operation of the reproducing unit, storage unit and the recording unit. The controlling unit causes data to be read out from the storage unit at a transmission rate equal to the standard recording rate of the second recording medium and routed to the recording unit to record the supplied data in the second recording medium.

17 Claims, 5 Drawing Sheets

RECORDING AND/OR REPRODUCING APPARATUS

This application is a 371 of PCT/JP00/01040 Feb. 23, 2000.

TECHNICAL FIELD

This invention relates to a recording and/or reproducing apparatus for recording data recorded on a first recording medium on a second recording medium. More particularly, it relates to a recording and/or reproducing apparatus in which copying from the first recording medium to the second recording medium is possible with a shorter stand-by time.

BACKGROUND ART

As a disc-shaped recording medium, employed as a data recording medium, a so-called compact disc (CD), which is an optical disc 12 cm or 8 cm in diameter, and an optical disc, 64 mm in diameter, which renders data re-recording possible even though it is further reduced in size, are presented to the market. In keeping pace with the coming into use of these optical discs, an apparatus for reproducing data recorded on the CD and an apparatus for recording data on and for reproducing the recorded data from the optical disc with a diameter of 64 mm, are also presented to the market.

Meanwhile, since the recording and/or reproducing apparatus employing a re-recordable optical disc with a diameter of 64 mm has been developed and presented to the market, the number of users who re-record the music data or other information recorded on the CD on the optical disc with the diameter of 64 mm to listen to the music data or the other information by the recording and/or reproducing apparatus designed for use with the optical disc with the diameter of 64 mm.

In such case, the CD reproducing device is connected by a connection cord to the recording and/or reproducing device for an optical disc with a diameter of 64 cm, the operation of the respective devices is controlled by a controller, such as a remote controller, the CD reproducing device is playback-paused state, the recording and/or reproducing device is recording-paused state, the paused state of the two devices is released simultaneously to reproduce the music data or the like information, referred to below simply as data, from the CD reproducing device, and the data reproduced from the CD is sent to the recording and/or reproducing device for recording on the optical disc with a diameter of 64 mm.

Referring to FIGS. 1 to 3, a dubbing system for recording CD data on an optical disc with a diameter of 64 mm is explained.

FIG. 1 shows the structure of a dubbing system, whilst FIG. 2 is a block diagram showing the structure of a CD reproducing device, and FIG. 3 is a block diagram showing the structure of an recording and/or reproducing device for an optical disc with a diameter of 64 mm.

The dubbing system 10, shown in FIG. 1, includes a CD reproducing device 12, a recording and/or reproducing device 14 for an optical disc with a diameter of 64 mm, and a controlling device 16, connected to system controllers 28, 52 of the CD reproducing device 12 and the recording and/or reproducing device 14, respectively, to control the operation of the two devices. The dubbing system, shown in FIG. 1, sends data from a signal processor 24 of the CD reproducing device 12 to a compression/expansion encoder/decoder 42 of the recording and/or reproducing deice 14, as the operations of the CD reproducing device 12 and the recording and/or reproducing device 14 are controlled by the controlling device 16. The data reproduced by the CD reproducing device 12 is recorded on the optical disc with the diameter of 64 mm by the recording and/or reproducing device 14.

In the system of FIG. 1, it is shown schematically that data is sent from the signal processor 24 to the compression/expansion encoder/decoder 42. Specifically, it is sufficient if an output of the digital output terminal of the CD reproducing device 12 is sent through a digital input terminal of the recording and/or reproducing device 14 to the encoder/decoder 42.

The CD reproducing device 12, used in the dubbing system 10 shown in FIG. 1, is a commercially available CD reproducing device for rotationally driving a CD at a CLV by a spindle motor 17 ro read out data recorded on the CD by an optical pickup 18 to route the output signal from the optical pickup 18 through an RF amplifier 20 to a demodulating unit 22. The demodulating unit 22 demodulates an EFM (eight-to-fourteen modulation) of an output signal from the RF amplifier 20 to route the demodulated output signal to the signal processor 24. The signal processor 24 routes the output signal of the demodulating unit 22 to an error correction unit 32 to execute error detection and correction, and routes the output signal, corrected for detected errors, to a D/A converter 26. The D/A converter 26 converts the output signal from the signal processor 24 into analog audio signals which are outputted at an output terminal 26. The signal processor 24 routes sub-code data etc to a system controller 28. The RF amplifier 20 generates a variety of error signals, such as focussing error signals or tracking error signals, based on the output signal of the optical pickup 18, to route the error signals produced to a servo circuit 30. Based on the focussing error signals and the tracking error signals, among the error signals routed from the RF amplifier 20, the servo circuit 30 generates the focussing servo signals and the tracking servo signals to route the servo signals generated to the optical pickup 18. The optical pickup 18 displaces the objective lens, not shown, based on the focussing error signals and the tracking error signals, supplied thereto, to execute focussing servo and tracking servo operations. The spindle motor 17 is fed from the servo circuit 30 with spindle servo signals to cause rotation of the CD at the CLV.

On the other hand, the recording and/or reproducing device 14 for an optical disc with a diameter of 64 mm, shown in FIG. 3, employs a magneto-optical disc as a recordable optical disc. This recording and/or reproducing device 14 is fed with analog audio signals from a microphone or an acoustic recording and/or reproducing device through an input terminal to an A/D converter 40. The A/D converter 40 converts the analog audio signals to digital audio signals, which are routed to the compression/expansion encoder/decoder 42. For recording on the optical disc D having a diameter of 64 mm, the compression/expansion encoder/decoder 42 compresses the digital audio signals routed from the A/D converter 40 in accordance with MDCT (Modified Discrete Cosine Transform).

Output data of the encoder/decoder 42 is transiently written in a memory 43a through a memory controller 43. For recording on the optical disc D, the memory controller 43 controls the write/readout of the memory 43a so that the readout speed of data written in the memory 43a will be faster than the write speed of output data in the memory 43a from the encoder/decoder 42. In reproducing the optical pickup D, the memory controller 43 controls the write/ readout of the memory 43*a* so that the readout speed of data written in the memory 43*a* will be slower than the write speed of output data in the memory 43*a* from the encoder/ decoder 42.

The output data from the encoder/decoder 42, transiently written in the memory 43*a*, is read out from the memory 43*a* at a transmission rate faster than the write speed of the output data in the memory 43*a*, and routed to a modulation/ demodulation and error correction unit 44. During recording on the optical disc D, the modulation/demodulation and error correction unit 44 performs error correction and encoding on the output data read out from the memory 43*a* to perform EFM. The recording data, outputted by the modulation/demodulation and error correction unit 44, is sent to a head driving unit 46 and thence routed to a magnetic head 48 based on the driving signals from the head driving unit 46.

The magnetic head 48 is placed facing the optical pickup 58, with the optical disc D in-between, and is moved in the radial direction of the optical disc D by a feed mechanism, not shown, having a feed motor 56 as a driving source. The magnetic head 48 sends a perpendicular magnetic field, modulated on the basis of recording data by driving signals sent from the head driving unit 46, to the optical disc D. The data is recorded on the optical disc D by the laser light of an output level necessary for recording being illuminated on the optical disc D from the optical pickup 58, with the perpendicular magnetic field, modulated on the basis of the recording data, being supplied from the magnetic head 48 to the optical disc D.

In recording the data on the optical disc D, the optical pickup 58 illuminates the laser light of an output level necessary for recording, whereas, in reproducing data from the optical disc D, the optical pickup 58 illuminates the laser light of an output level lower than that in recording to read out the data recorded on the optical disc D by exploiting the Kerr effect. The optical pickup 58 includes a semiconductor laser element, as a light source for outputting the laser light, a photodetector having plural light receiving units for receiving the reflected light from the optical disc D, an objective lens for converging the laser light outputted by the semiconductor laser element on a recording surface of the optical disc D, an actuator for causing movement in the focussing and tracking directions, based on the focussing servo signals and the tracking servo signals from servo circuit 54 as later explained and an optical system for directing the laser light outputted by the semiconductor laser element to the objective lens or directing the reflected light from the optical disc D to the photodetector.

In reproducing the optical disc D, the data read out from the optical disc D, that is the output signal of the photodetector of the optical pickup 58, is amplified by an RF amplifier 59 and thence supplied to the modulation/demodulation and error correction unit 44 where the signal is processed with EFM demodulation and error correction. Output data of the modulation/demodulation and error correction unit 44 is written in the memory 43*a* through the memory controller 43. At this time, the output data of the modulation/demodulation and error correction unit 44 is read out from the memory 43*a* at a transmission rate slower than the output data writing speed in the memory 43*a*. When the output data is written to the full storage capacity of the memory 43*a*, data readout from the optical disc D by the optical pickup 58 is halted, with the optical pickup 58 being then paused and placed in a standby state at the readout interrupted position of the optical disc D. As a result, the data is read out intermittently from the optical disc D. On the other hand, even if there occurs the so-called track jump in which the scanning position by the optical pickup 58 is skipped under an impact applied from outside to the recording and/or reproducing apparatus 14 during the optical disc reproducing operation, the data stored in the memory 43*a* may be outputted. As the data stored in the memory 43*a* is read out, the scanning position of the optical pickup 43*a* is restored to the normal scanning position and data readout from the optical disc D is re-initiated to output analog audio signals in succession from the output terminal.

The data read out from the memory 43*a* is fed to the compression/expansion encoder/decoder 42 where it is processed with expansion. The digital audio signals, outputted by the encoder/decoder 42, is routed to a D/A converter 41 where it is converted to analog audio signals which are outputted at an output terminal.

The RF amplifier 59 generates various error signals, such as focussing error signals, tracking error signals and spindle error signals, based on the output signal from the optical pickup 58, to route the various error signals to the servo circuit 54. The servo circuit 54 generates focussing servo signals and the tracking servo signals, based on the focussing error signals and the tracking error signals supplied from the RF amplifier 59, to generate focussing servo signals and tracking servo signals, which then are supplied to the actuator of the optical pickup 58 to cause movement of the objective lens of the optical pickup 58 in the focussing and tracking directions. The servo circuit 54 also generates spindle servo signals, based on the spindle error signals sent from the RF amplifier 59.

The spindle servo signals, generated by the servo circuit 54, are routed to a spindle motor 50, which then rotationally drives the optical pickup with e.g., the CLV, based on the spindle servo signals supplied thereto.

The servo circuit 54 also generates signals driving the feed motor 56, based on low frequency components of the tracking error signals supplied from the RF amplifier 59, while generating feed signals required for accessing, based on a control signal supplied from a system controller 52, to route the generated feed signal to the feed motor 56. As a result, the optical pickup 58 and the magnetic head 48 are moved along the radius of the optical disc D.

The output signal of the RF amplifier 59 is routed to an address decoder 57 where address data of the optical disc D is extracted and routed to the modulation/demodulation and error correction unit 44 for error correction. The resulting data is routed to the system controller 52 so as to be used for e.g., the accessing operation.

The system controller 52 is made up of a micro-computer and controls the operation of the various components of the recording and/or reproducing device, such as the modulation/demodulation and error correction unit 44 or the memory controller 43.

In the dubbing system 10, described above, output signals of the signal processor 24 of the reproducing device 12, that is digital audio signals read out from the CD, are sent to the compression/expansion encoder/decoder 42 of the recording and/or reproducing device for compression and further modulation as well as error correction so as to be then recorded on the optical disc D. The control of the recording operation by the recording and/or reproducing device 14 of the digital audio signals outputted by the reproducing device 12 is by the system controller 28 of the reproducing device 12 and by the system controller 52 under control by the controlling device 16. Specifically, in the reproducing operation by the reproducing device 12 and the recording operation by the recording and/or reproducing device 14, the system controllers 28 and 52 are controlled in timed relation to each other by the controlling device 16.

If, in the above-described dubbing system, data is to be dubbed from the CD to the optical disc D having the diameter of 64 mm, both the CD reproducing device 12 and the recording and/or reproducing device 14 are operated so that the data recorded on the CD will be reproduced by the CD reproducing device 12 and so that the reproduced data will be recorded in real time on the optical disc D by the recording and/or reproducing device 14. The result is that the dubbing time is of the same duration as the reproducing time of the musical number recorded on the CD and which desirably is to be dubbed on the optical disc D.

The result is that the user has to wait near the CD reproducing device 12 and the recording and/or reproducing device 14, during the time the number recorded on the CD and which is desired to be dubbed is reproduced, owing to the operations of the CD reproducing device 12 and the recording and/or reproducing device 14. For example, if the CD reproducing time is 74 minutes and the totality of the musical numbers recorded on the CD is to be recorded on the optical disc D of the recording and/or reproducing device 14, the user has to wait for 74 minutes which is the time required in reproducing the totality of the musical numbers recorded on the CD.

In particular, if a certain musical number is selected from each of plural CDs for recording on the optical disc, the user has to wait until the recording operation on the optical disc is terminated in order to perform the CD exchanging operation. Since the standby time during which the user monitors the recording operation is long thus inconveniencing the user. So, a demand is raised for development of a system with a shorter standby time convenient for the user.

In the above explanation, dubbing on an optical disc, with a diameter of 64 mm, which permits recording from a CD, is taken as an example. However, a similar problem arises not only in the case of dubbing from the CD to the recordable optical disc but also in dubbing data from a first disc-shaped recording medium to the second disc-shaped recording medium if the recording speed for the second disc-shaped recording medium is slower than the reproducing speed from the first disc-shaped recording medium.

DISCLOSURE OF THE INVENTION

It is therefore an object of the present invention to overcome the problem inherent in the above-described system and to provide a recording and/or reproducing device in which data dubbing can be achieved more promptly to shorten the standby time.

In one aspect, the present invention provides a recording and/or reproducing apparatus including a reproducing unit for reading out data from a first recording medium at a transmission rate higher than a standard readout rate of the first recording medium, a storage unit for storing data read out from the first reproducing unit, a recording unit for storing data read out from the storage unit in a second recording medium, and a controlling unit for controlling the operation of the reproducing unit, storage unit and the recording unit. The controlling unit causes the data from the reproducing unit to be written in the storage unit at a transmission rate higher than the standard readout rate of the second recording medium. The controlling unit causes the data to be read out from the storage unit at a transmission rate equal to the standard recording rate for the second recording medium to route the read-out data to the recording unit to cause the routed read-out data to be recorded on the second recording medium.

Preferably, the controlling unit causes the data to be read out from the storage unit and routed to the recording unit when the reproducing operation of the first recording medium by the reproducing unit comes to a close. The controlling unit causes the read-out data to be recorded on the second recording medium by the recording unit.

Preferably, the controlling unit causes data to be read out from the storage unit when the reproducing operation for the first recording medium by the reproducing unit comes to a close, the controlling unit then causing the read-out data to be recorded on the second recording medium.

Preferably, the controlling unit halts the recording operation by the second recording unit if the second recording medium is not loaded on the recording unit when the time is the starting time.

Preferably, the storage unit includes a data processing unit for encoding data from the reproducing unit when writing data read out from the reproducing unit and for decoding data when reading out the data and a data storage unit in which is written data from the data processing unit.

Preferably, the data processing unit is controlled by the controlling so that data read out from the data storage unit is decoded and read out at a transmission rate equal to the standard recording rate for the second recording medium.

In another aspect, the present invention provides a recording and/or reproducing apparatus including a reproducing unit having a decoding processing unit for decoding data read out from the first recording medium at a transmission rate faster than the standard readout rate for the first recording medium to output a playback signal, and a first controlling unit for controlling the decoding processing unit. The recording and/or reproducing apparatus also includes a storage unit for storing data read out from the first recording medium, a recording unit having an encoding unit for encoding data read out from the storage unit and a second controlling unit for controlling the encoding unit, with the recording unit storing output data from the encoding unit in a second recording medium, and a third controlling unit for supplying a control signal to the first controlling unit and to the second controlling unit to control the operation of the reproducing unit and the operation of the recording unit. The third controlling unit supplies a control signal to the storage unit to read out data from the storage unit at a transmission rate equal to a standard recording rate of the second recording medium. The third controlling unit also sends a control signal to the second controlling unit to cause the supplied data to be recorded on the second recording medium.

Preferably, the third controlling unit causes data to be read out from the storage unit after end of the reproducing operation of the first recording medium by the reproducing unit to route the read-out data to the recording unit. The read-out data is recorded by the recording unit on the second recording medium.

In yet another aspect, the present invention provides a recording and/or reproducing apparatus including a reproducing unit for reading out data from a first recording medium at a transmission rate higher than a standard readout rate of the first recording medium, a data storage unit for storing data read out from the first reproducing unit, a recording unit for storing data read out from the storage unit in a second recording medium and a controlling unit for controlling the operation of the reproducing unit, data storage unit and the recording unit. The controlling unit causes data to be read out from the data storage unit and supplied to the recording unit for recording thereon after the entire data read out from the first recording medium is stored in the data storage unit.

Preferably, the controlling unit causes the data to be read out from the storage unit and routed to the recording unit when the reproducing operation of the first recording medium by the reproducing unit comes to a close. The controlling unit causes the read-out data to be recorded on the second recording medium by the recording unit.

Other objects and advantages of the present invention will become apparent from the following description of the preferred embodiments and the claims.

BEST MODE FOR CARRYING OUT THE INVENTION

Figure 1:
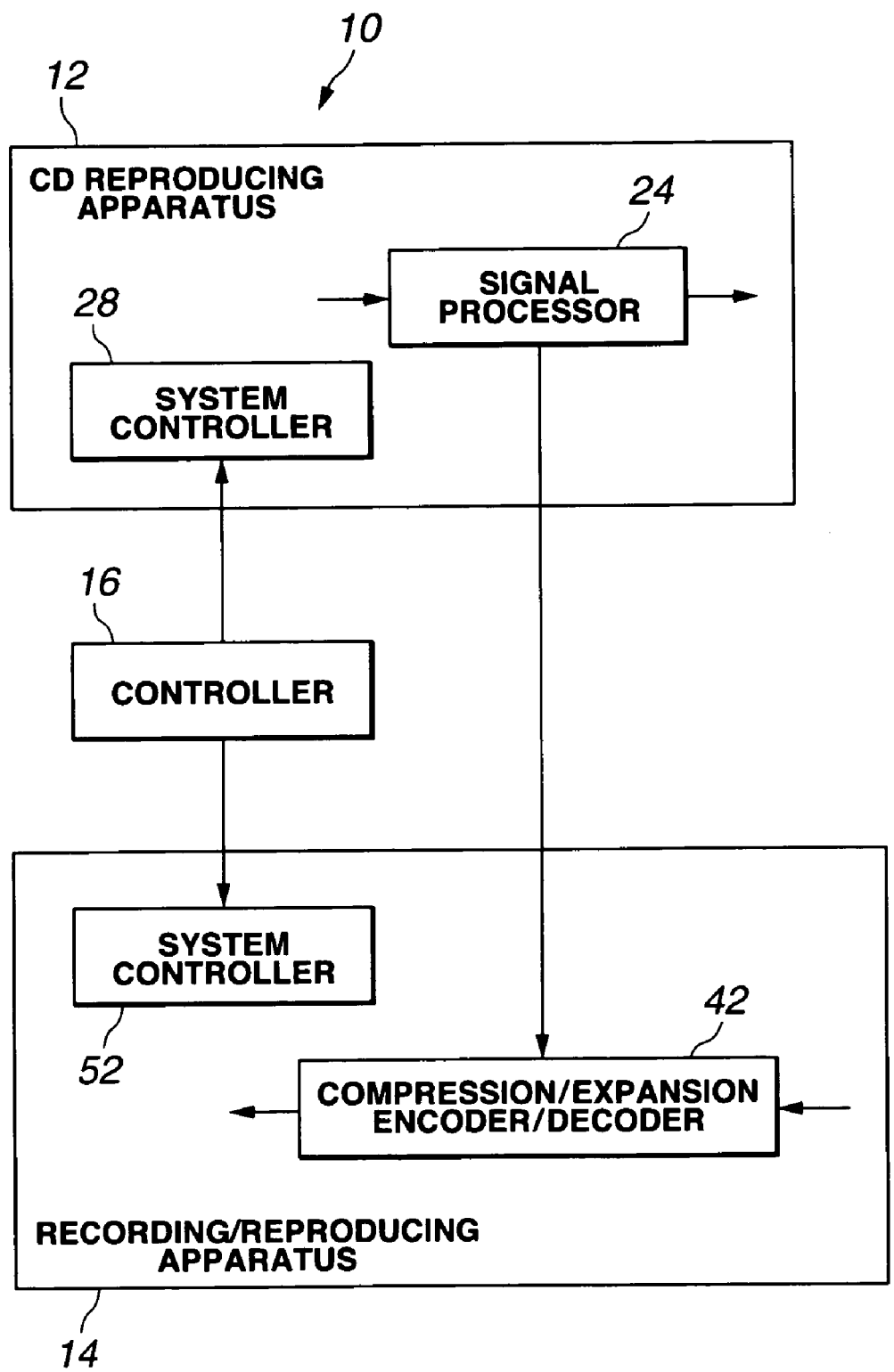
FIG. 1 is a block diagram for illustrating the schematics of a dubbing system from which the present invention is derived.

Referring to the drawings, preferred embodiments of a recording and/or reproducing system according to the present invention will be explained in detail. The recording and/or reproducing system, now explained, is such a recording and/or reproducing system in which data read out from a so-called compact disc (CD), which is an optical disc as a first recording medium, is recorded on a recordable optical disc D as a second recording medium. The recordable optical disc D, used here as the second recording medium by way of an example, is a magneto-optical disc, with a diameter of 64 mm, similarly to the optical disc D used in the recording and/or reproducing device 14 of FIG. 3, as described above.

Figure 2:
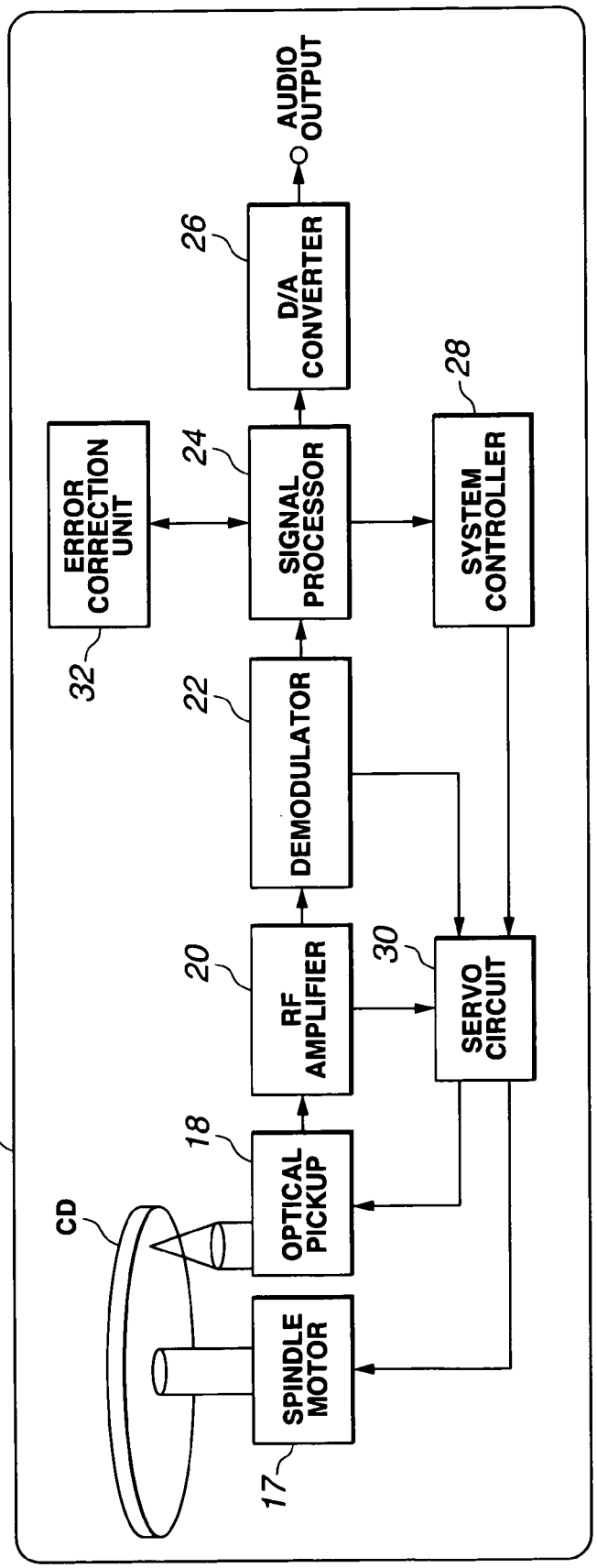
FIG. 2 is a block diagram showing the structure of a reproducing device used in the dubbing system of FIG. 1.
Figure 3:
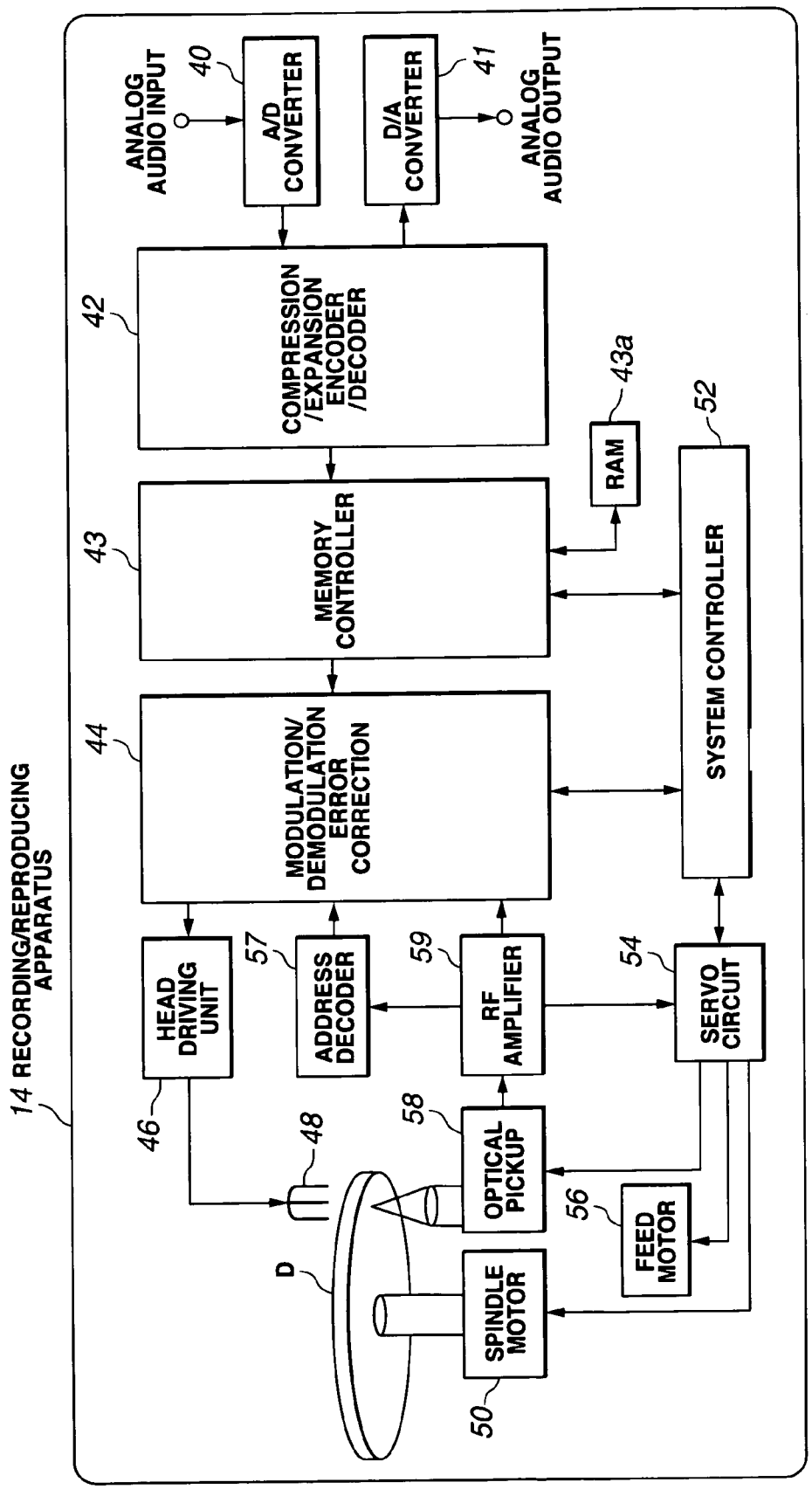
FIG. 3 is a block diagram showing the structure of a recording and/or reproducing device used in the dubbing system of FIG. 1.

In the following description, the parts or components common to those shown in FIGS. 1 to 3 are depicted by the same reference numerals and the foregoing description is applied to avoid redundancy.

Figure 4:
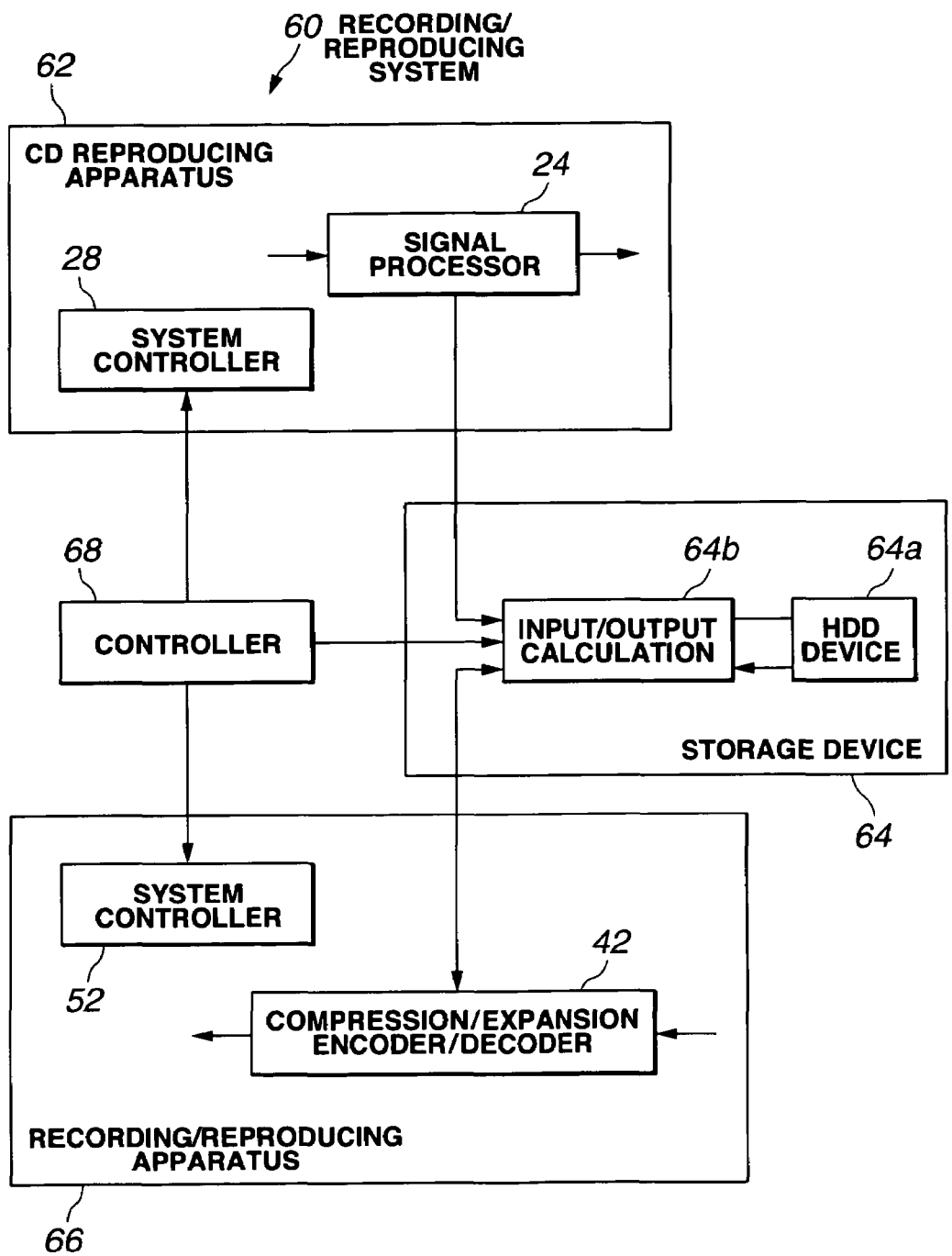
FIG. 4 is a block diagram showing the schematic structure of a recording and/or reproducing device according to the present invention.

A recording and/or reproducing system 60, pertaining to the present invention, includes a reproducing device 62 for reproducing a CD as a first recording medium, a recording and/or reproducing device 66 for recording and/or reproducing the recordable optical disc D as the second recording medium, a control device 68 for controlling the operation of the reproducing device 62 and the recording and/or reproducing device 66, and a storage device 64, as shown in FIG. 4.

The reproducing device 62 is configured similarly to the reproducing device 12, and reads out data recorded on the CD by the optical pickup 18 from the CD. The data read out by the optical pickup 18 is EFM-demodulated by a demodulating unit 22 and corrected for errors in an error correction unit 32 so as to be then outputted as digital audio signals or digital audio data from the signal processor 24. In the above-described reproducing device, data is read out from the CD at a transmission rate of 1.4 Mbps whereas, in the reproducing device 62 of the present invention, the CD is read out at a transmission rate not lower than the standard transmission rate of the reproducing device 62, that is at a transmission rate not lower than 1.4 Mbps, for example, at a transmission rate equal to 32 times 1.4 Mbps. That is, in the reproducing device 62, the spindle motor 17 is driving-controlled by the system controller 52 so that the CD will be rotated at a speed equal to, for example, 32 times as fast as the rotational speed of the CD in the above-described reproducing device 12. On the other hand, reference clocks CK, supplied to the demodulating unit 22 or to the signal processor 24, are of a clock rate 32 times as fast as the reference clocks CK supplied in the reproducing device 12 to the demodulating unit.

The recording and/or reproducing device 66 is configured similarly to the above-described recording and/or reproducing device 14, such that digital signals or digital data outputted by the reproducing device 62 and supplied from the storage device 64 are furnished to the compression/expansion encoder/decoder 42 so as to be transiently written in the memory 43a in accordance with a pre-set system, such as the modified DCT, as described above. The digital signals or digital data are then read out from the memory 43a at a pre-set timing, so as to be then corrected for errors and demodulated in the modulation/demodulation and error correction unit 44 for recording on the optical disc $D_0$ by a magnetic head 48 and an optical pickup 58.

The recording device 64 has an input output/calculation unit 64b and a hard disc drive device (HDD device) 64a. The input output/calculation unit 64b processes the digital audio signals outputted by the signal processor 24 of the reproducing device 62 with modulation and error correction and encoding to route the resulting signals to the HDD device 64a for recording the signals on the HDD device 64a. The HDD device 64a is controlled as to data writing and data readout by the input output/calculation unit 64b, so that data writing and readout will occur at a rate of 2 Mbytes/sec which is faster than the standard transmission rate of the recording and/or reproducing device 66, that is 1.4 Mbps, and which is lower than the transmission rate of the reproducing device 62, that is 5.6 Mbyte/sec (=44.8 Mbps=1.4 Mbps×32). The HDD device 64a has a storage capacity corresponding at least to a CD storage capacity, that is a storage capacity not less than approximately 650 Mbytes.

Figure 5:
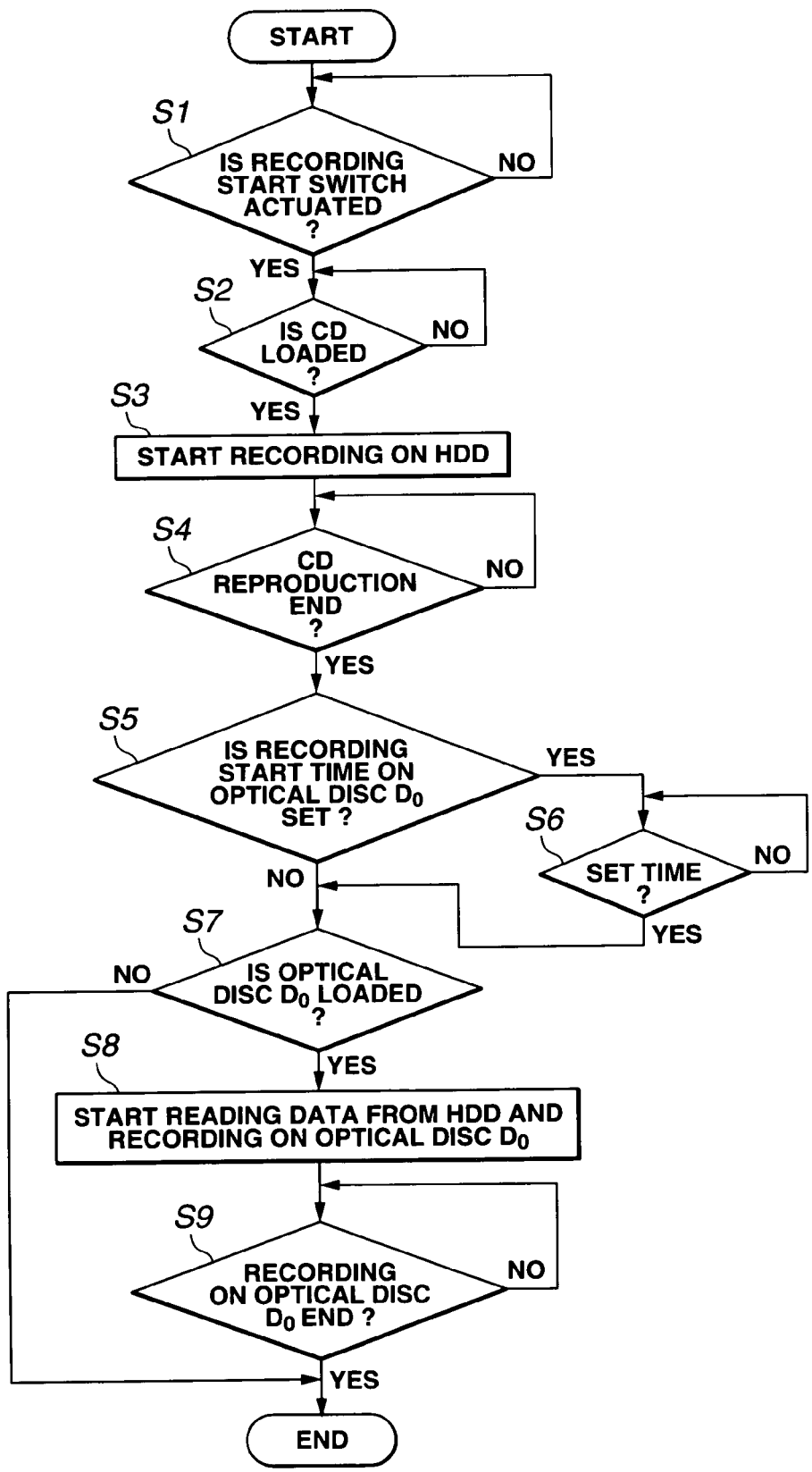
FIG. 5 is a flowchart for illustrating the recording operation of a recording and/or reproducing system according to the present invention.

The control device 68 controls the operation of the reproducing device 62 and the recording and/or reproducing device 66, as it controls the storage device 16, while controlling the operation of the storage device 64. To the control device 68 is connected an operating unit having plural switches, such as a recording start switch, not shown, actuated by a user for starting the recording of data recorded on the CD on the optical disc $D_0$ or a recording stop switch, also not shown, actuated by a user, for halting the recording. The control device 68 generates a control signal, associated with the switch of the operating unit actuated by the user, to route the generated control signal to the reproducing device 62, recording and/or reproducing device 66 and to the recording device 64 to control the operations thereof. The recording and/or reproducing system 60, constructed as described above, records the digital audio signals, read out from the CD, as the first recording medium, on the recordable disc $D_0$, as the second recording medium, in accordance with the following sequence of operations:

First, Referring to FIG. 5, it is checked at step 1, by the control device 68, whether or not a recording start switch of an operating unit has been actuated by the user. If the recording start switch is not actuated at step S1, the stand-by state is set until the switch is actuated. If it is verified at step 1 by the control device 68 that the recording start switch has been actuated, the control device 68 proceeds to step S2, where it is checked by the control device 68 whether or not the CD has been loaded on the reproducing device 62. The checking as to whether or not the CD has been loaded on the reproducing device 62 is made by the system controller 28 verifying whether or not the focussing servo loop of the optical pickup 18 has been closed, and whether or not an output signal has been obtained from the optical pickup 18, and by the results of check of the system controller 28 being routed to the control device 68. If it is found at step S2 that no CD is loaded on the reproducing device 62, the control device 68 demonstrates a prompt for the user to load the CD in position and sets a standby state until the CD is loaded on the reproducing device 62.

If it is verified at step S2 that the CD has been loaded on the reproducing device 62, the control device 68 proceeds to step S3 to send control signals to the reproducing device 62 and to the storage device 64 to initiate the reproducing operation of the reproducing device 62. The digital audio signals or the digital audio data, read out from the CD of the reproducing device 62, are sent to the input output/calculation unit 64b of the storage device 64, where the digital audio signals or the digital audio data are processed as described above, so as to be then written in the HDD device 64a. It is noted that, in the reproducing device 62, the CD is reproduced at a reproducing rate not lower than 1.4 Mbps, for example, at a rate 32 times 1.4 Mbps, the transfer rate of the digital audio signals or the digital audio data outputted by the reproducing device 62 is 5.6 Mbytes/sec (=1.4 Mbps×32=44.8 Mbps). Since the data writing rate in the HDD device 64a is 2 Mbyte/sec, the readout rate of the digital audio signals or the digital audio data from the reproducing device 62 is faster than the data write rate for the HDD device 64a. Thus, the waiting time for the user until writing of the signal or data read out from the CD in the HDD device 64a comes to a close depends on the writing rate in the HDD device 64a. If, in the above-described example, the CD storage device has a storage capacity of 650 Mbytes, the write rate for the HDD device 64a is 2 Mbytes/sec or 120 Mbytes/minute, so that the waiting time for the user is 5 minutes 25 seconds (650÷120=5.416).

At step S3, recording of the digital audio signals or the digital audio data from the reproducing device 62 to the HDD device 64a is started. It is then verified at step S4 whether or not the CD reproduction by the reproducing device 62 has come to a close in its entirety. As an example, this decision on whether or not the reproduction of the CD has come to a close in its entirety is given by the system controller 28 discriminating whether or not the CD readout point by the optical pickup 18 has reached the last address of the musical number as recorded on the CD and by the result of decision being routed to the control device 68. The user may quit at the time point of completion of the CD reproduction. The decision as to the end of CD reproduction may be replaced by detection at step S4 of whether or not data recording on the HDD device 64a has come to a close.

When the CD reproduction at step S4 comes to a close, the control device 68 proceeds to step S5 where it is checked whether or not the time of starting the recording on the recordable optical disc $D_0$ of the recording and/or reproducing device 66 has been set by the user. For example, it is verified by the control device 68 whether or not the recording start time for the optical disc $D_0$ has been set by the above-mentioned actuator, not shown, in the timer circuit, also not shown, enclosed in or connected to the control device 68. If it is found at step S5 that the recording start time for the optical disc $D_0$ has been set, the control device 68 proceeds to step S6 where the control device 68 verifies whether or not the time is the time as set by the user. If, at step S6, the time is not the time as set by the user, the standby state is set until the time is the time as set by the user. If it is found at step S6 that the time is the time as set by the user, the control device 68 proceeds to step S7. By the user setting at step S5 the recording start time on the optical disc $D_0$, data can be read out from the HDD device 64a during the non-use time of the recording and/or reproducing device 66 or in a time zone desired by the user to record the read-out data on the optical disc $D_o$.

If the time for recording start time for the recordable optical disc $D_0$ of the recording and/or reproducing device 66 is not et at step S5, the control device immediately controls the storage device 64 and the recording and/or reproducing device 66 so that the digital audio signals or the digital audio data as read out from the HDD device 64a will be made recordable on the optical disc $D_0$. The control device 68 then proceeds to step S7.

At step S7, it is verified whether or not the recordable optical disc $D_0$ has ben loaded on the recording and/or reproducing device 66. At this step S7, the technique or a mechanical switch similar to those used at step S2 is used. The results of decision are sent from the system controller 52 to the control device 68. If, at step S7, the optical disc $D_0$ has not been loaded on the recording and/or reproducing device 66, processing is terminated without recording on the optical disc $D_0$. If, at step S7, the optical disc $D_0$ has been loaded on the recording and/or reproducing device 66, the control device 68 proceeds to step S8.

At step S8, the control device 68 sends control signals to the storage device 64 and to the recording and/or reproducing device 66 to cause data to be read out from the HDD device 64a of the storage device. The control device 68 causes the read-out data to be processed with error correction and demodulation etc in the input output/calculation unit 64b as described above to route the resulting digital audio signals or the digital audio data to the compression/expansion encoder/decoder 42 of the recording and/or reproducing device 66. The compression/expansion encoder/decoder 42 compresses the digital audio signals or the digital audio data. Output data of the encoder/decoder 42 are transiently written in the memory 43a and thence supplied to the modulation/demodulation and error correction unit 44 where the data are processed as described above before being routed to the magnetic head 48. The laser light is illuminated on the optical disc $D_0$ from the optical pickup 58, as the perpendicular magnetic field is applied from the magnetic head 48 to the optical disc $D_0$, for recording the data on the optical disc $D_0$. Meanwhile, the recording and/or reproducing device 66 records data outputted at a standard transmission rate of 1.4 Mbps from the modulation/demodulation and error correction unit 44 on the optical disc $D_0$.

When the data read out from the HDD device 64a commences to be recorded at step S8 on the optical disc $D_0$, it is checked at step S9 whether or not the recording on the optical disc $D_0$ has come to a close. Whether or not the recording on the optical disc $D_0$ has come to a close is verified by the system controller 52 verifying whether or not the entire data stored in the memory 43a has been read out and recorded on the optical disc $D_0$ and by the system controller 52 routing the results of check to the control device 68. If it is found at step S9 that the recording on the optical disc $D_0$ has not come to a close, the recording operation is continued until the recording operation by the recording and/or reproducing device 66 comes to a close. If it is found at step S9 that the recording on the optical disc $D_0$ has come to a close, the processing; is terminated to halt the operation of the storage device 64 and the recording and/or reproducing device 66.

In the above-described recording and/or reproducing system according to the present invention, the signals or data read out at a high speed from the reproducing device 62 are transiently stored in the HDD device 64a of the storage device 64 and subsequently stored at a pre-set timing on the optical disc $D_0$ of the recording and/or reproducing device 66. This enables high-speed data reading from the reproducing device 62 thus realizing a shorter standby time for the user. For example, if a certain musical number from each of the plural CDs is to be recorded on the optical disc $D_0$, the user may quit when the CD reproduction by the reproducing device 62 comes to a close, thus shortening the standby time for the user.

Although the above-described recording and/or reproducing system is of such a configuration in which a reproducing device, a recording and/or reproducing device, a controller and a storage device are interconnected by a connection cord, the reproducing device, recording and/or reproducing device, controller and the storage device may also be constructed as a sole recording and/or reproducing device, or the controller and the storage device may be assembled into a sole device which is connected between the reproducing device and the recording device.

Although the entire musical numbers recorded on the CD are recorded in the above description on the optical disc $D_0$, at least one of the musical numbers recorded on the CD may be recorded on the optical disc $D_0$. Moreover, at least one musical number from each of plural CDs may be selected and recorded on the optical disc $D_0$.

In the above description, the first recording medium is the CD, whilst the second recording medium is the recordable optical disc. The second recording medium may also be a semiconductor memory or a magnetic disc capable of recording or storing data thereon, whereas the first recording medium, as a signal or data supply source, may also be a magnetic tape or a magnetic disc, carrying recorded signals or data, such as musical numbers, in place of the CD. Although the data is stored in the above description in the HDD device, a storage device employing a semiconductor memory may be used in place of the HDD device. The signals or data recorded on the first recording medium or on the second recording medium may be video signals or data or computer data in place of the audio signals or data.

It is to be noted that the present invention can be modified in many ways without significantly modifying the purport of the invention.

INDUSTRIAL APPLICABILITY

In the recording and/or reproducing system according to the present invention, in which signals or data read out at an elevated speed from a reproducing device are transiently stored in a storage device and subsequently recorded on an optical disc of the recording and/or reproducing device at a pre-set timing, data can be read out at an elevated speed from the reproducing device, thereby shortening the standby time for the user in recording the data.

The invention claimed is:

1. A digital recording and/or reproducing apparatus comprising:
    a reproducing unit for reading out digital data from a first disk-shaped optical disk recording medium having a known read out rate at a first transmission rate substantially higher than said known read out rate of said first disk shaped optical disk recording medium;
    a temporary storage unit directly connected to said reproducing unit and including a hard disk drive for temporarily storing digital data read out by said reproducing unit, wherein said temporary storage unit includes an input/output calculation unit for processing the digital data read out from the reproducing unit with modulation, error correction, and encoding before feeding to said hard disk drive of the temporary storage unit for temporarily storing the digital data;
    a recording unit for recording digital data read out from said storage unit in a second disk-shaped optical disk recording medium having a known recording rate equal to the known readout rate of said first disk-shaped optical disk; and
    controlling means for controlling respective operations of said reproducing unit, said temporary storage unit and said recording unit, said controlling means controlling said input/output calculation unit to cause the digital data from said reproducing unit to be written in said hard disk drive of said temporary storage unit at a second transmission rate higher than the known recording rate of said second disk-shaped optical disk recording medium and lower than said first transmission rate, said controlling means controlling said input/output calculation unit to cause the digital data to be read out from said hard disk drive of said temporary storage unit at said second transmission rate, and for outputting the read out data to said recording unit at said known recording rate of said second disk-shaped optical disk and causing the routed read out data to be recorded in said second disk-shaped optical disk recording medium.

2. The recording and/or reproducing apparatus according to claim 1 wherein when the reading out operation of said reproducing unit comes to a close, said controlling means causes the read out data to be recorded on said second disk-shaped optical disk recording medium by said recording unit.

3. The recording and/or reproducing apparatus according to claim 1 wherein when the reading out operation from said first disk-shaped optical disk recording medium by said reproducing unit comes to a close, said controlling means causes the read out data to be recorded on said second disk-shaped optical disk recording medium.

4. The recording and/or reproducing apparatus according to claim 3 wherein said controlling means halts the recording by said recording unit when said second disk-shaped optical disk recording medium is not loaded on said recording unit at a starting time.

5. The recording and/or reproducing apparatus according to claim 1 wherein said input/output calculation unit is controlled by said controlling means so that data read out from said hard disc drive of said temporary storage unit is decoded and read out at said third transmission rate equal to the known recording rate for said second disk-shaped optical disk recording medium.

6. A digital recording and/or reproducing apparatus comprising:
- a reproducing unit including a decoding processing unit for decoding data read out from a first disk-shaped optical disk recording medium at a first transmission rate substantially faster than a known readout rate for said first disk-shaped optical disk recording medium and for outputting a playback signal and a first controlling unit for controlling said decoding processing unit;
- a temporary storage unit including a hard disk drive for storing data read out from said first disk-shaped optical disk recording medium, wherein said storage unit includes an input/output calculation unit for processing the digital data from the reproducing unit with modulation, error correction, and encoding before feeding the digital data at a second transmission rate lower than said first transmission rate to a hard disk drive of the temporary storage unit for temporarily storing the digital data;
- a recording unit including an encoding unit for encoding digital data read out from said hard disk drive of said temporary storage unit and a second controlling unit for controlling said encoding unit, said recording unit storing digital output data from said encoding unit in a second disk-shaped optical disk recording medium having a known recording rate equal to the readout rate for said first disk-shaped optical disk; and
- a third controlling unit for supplying respective control signals to said first controlling unit and to said second controlling unit to control operation of said reproducing unit and operation of said recording unit, said third controlling unit supplying a control signal to said input/output calculation unit of said temporary storage unit to read out digital data from said hard disc drive a second transmission rate and for outputting the readout data to said recording unit at said known recording rate of said second disk-shaped optical disk, said third controlling unit sending a control signal to said second controlling unit to cause digital data supplied thereto to be recorded on said second disk-shaped optical disk recording medium at the known recording rate for said second disk-shaped optical disk recording medium.

7. The recording and/or reproducing apparatus according to claim 6 wherein said third controlling unit causes digital data to be read out from said temporary storage unit after an end of the reproducing operation of said first disk-shaped optical disk recording medium by said reproducing unit to route the read out data to said recording unit, the read out data being recorded by said recording unit on said second disk-shaped optical disk recording medium.

8. The recording and/or reproducing apparatus according to claim 6 wherein, when the data recording start time point is previously set in said second disk-shaped optical disk recording medium, said third controlling unit causes digital data to be read out from said hard disk drive of said temporary storage unit when the time is at the data recording start time point to route the read out data to said recording unit to cause the read out data to be recorded on said second disk-shaped optical disk recording medium.

9. The recording and/or reproducing apparatus according to claim 6 wherein, when said second disk-shaped optical disk recording medium is not loaded on said recording unit and the time is the data recording start time point, said third controlling unit halts the recording operation of said second disk-shaped optical disk recording medium.

10. The recording and/or reproducing apparatus according to claim 6 wherein said input/output calculation unit is controlled by said third controlling unit so that digital data read out from said temporary data storage unit is processed with further decoding so that the data is read out at the third transmission rate equal to the known recording rate of said second disk-shaped optical disk recording medium.

11. A digital recording and/or reproducing apparatus comprising:
- a reproducing unit for reading out digital data from a first disk-shaped optical disk recording medium at a first transmission rate substantially higher than a known readout rate of said first removable disk recording medium;
- a temporary data storage unit including a hard disk drive for storing data read out by said reproducing unit, wherein said storage unit includes an input/output calculation unit for processing the digital data from the reproducing unit with modulation, error correction, and encoding before feeding the digital data at a second transmission rate lower than said first transmission rate to said hard disk drive of the temporary data storage unit for temporarily storing the digital data;
- a recording unit for recording digital data read out from said temporary storage unit in a second removable disk recording medium having a known recording rate equal to the readout rate of said first disk-shaped optical disk; and
- controlling means for controlling respective operations of said reproducing unit, said temporary data storage unit and said recording unit, said controlling means controlling said input/output calculation unit to cause data to be read out from said temporary data storage unit, at a said second transmission rate and for outputting the readout data to said recording unit for recording thereon at the known recording rate for said second disk-shaped optical disk recording medium, after all of the data read out from the first removable disk recording medium is stored in said hard disk drive of said temporary data storage unit.

12. The recording and/or reproducing apparatus according to claim 11 wherein said controlling means causes the digital data to be read out from said hard disk drive of said temporary storage unit and routed to said recording unit and when the reading out operation of said first disk-shaped optical disk recording medium by said reproducing unit comes to a close, said controlling means causes the read out data to be recorded on said second disk-shaped optical disk recording medium by said recording unit.

13. The recording and/or reproducing apparatus according to claim 11 wherein said controlling means causes digital data to be read out from said hard disk drive of said temporary storage unit and when the reproducing operation for said first disk-shaped optical disk recording medium by said reproducing unit comes to a close, said controlling means causes the read out data to be recorded on said second disk-shaped optical disk recording medium.

14. The recording and/or reproducing apparatus according to claim 13 wherein, when a time is a starting time and the second disk-shaped optical disk recording medium is not loaded on said recording unit, said controlling means halts the recording operation of said recording unit.

15. The recording and/or reproducing apparatus according to claim 11, wherein said input/output calculation unit is controlled by said controlling means so that data read out from said hard disk drive of said data storage unit is decoded and read out at a the third transmission rate equal to the predetermined recording rate for said second disk-shaped optical disk recording medium.

16. A digital recording and/or reproducing apparatus comprising:
- a reproducing unit for reading out digital data from a first disk-shaped optical disk recording medium at a first transmission rate substantially faster than a known readout rate of said first disk-shaped optical disk recording medium;
- a temporary data storage unit including a hard disk drive for temporarily storing digital data read out from said reproducing unit, wherein said data storage unit includes an input/output calculation unit for processing the digital data from the reproducing unit with modulation and error correction and encoding before feeding the digital data at a second transmission rate lower than said first transmission rate and higher than the known readout rate of said first disk-shaped optical disk to said hard disk drive of the temporary data storage for temporarily storing the digital data;
- a recording unit for recording said digital data read out from the temporary data storage unit in a second disk-shaped optical disk recording medium having a known recording rate equal to the readout rate of said first disk-shaped optical disk; and
- controlling means for controlling said reproducing unit, said temporary data storage unit and said recording unit, said controlling means operating so that, when a data recording starting time point is previously set on said second disk-shaped optical disk recording medium, said controlling means controls said input/output calculation means to read out data from said hard disk drive of said temporary data storage unit at said second transmission rate and to output the readout data to said recording unit at the known recording rate for said second disk-shaped optical disk when a time is the recording starting time point, with the read out data being recorded on said second disk-shaped optical disk recording medium at the known recording rate for said second disk-shaped optical disk recording medium.

17. The recording and/or reproducing apparatus according to claim 16 wherein, when said second disk-shaped optical disk recording medium is not loaded on said recording unit and the time is the recording starting time point, said controlling means halts the recording operation of said recording unit.

* * * * *

UNITED STATES PATENT AND TRADEMARK OFFICE
CERTIFICATE OF CORRECTION

PATENT NO. : 7,085,205 B1 Page 1 of 1
APPLICATION NO. : 09/674106
DATED : August 1, 2006
INVENTOR(S) : Takashi Kinouchi It is certified that error appears in the above-identified patent and that said Letters Patent is hereby corrected as shown below:

In Column 13, Line 36, insert --at-- after "drive";
In Column 14, Line 34, delete "a".

Signed and Sealed this

Seventeenth Day of April, 2007

JON W. DUDAS
*Director of the United States Patent and Trademark Office*